(12) United States Patent
Myung et al.

(10) Patent No.: US 9,054,849 B2
(45) Date of Patent: Jun. 9, 2015

(54) METHOD FOR ENCODING CONTROL INFORMATION IN A COMMUNICATION SYSTEM, AND METHOD AND APPARATUS FOR TRANSMITTING AND RECEIVING THE CONTROL INFORMATION

(75) Inventors: Se-Ho Myung, Suwon-si (KR); Jae-Yoel Kim, Suwon-si (KR); Yeon-Ju Lim, Seoul (KR); Sung-Ryul Yun, Suwon-si (KR); Hong-Sil Jeong, Seoul (KR)

(73) Assignee: Samsung Electronics Co., Ltd (KR)

( * ) Notice: Subject to any disclaimer, the term of this patent is extended or adjusted under 35 U.S.C. 154(b) by 1237 days.

(21) Appl. No.: 12/723,060

(22) Filed: Mar. 12, 2010

(65) Prior Publication Data

US 2010/0232544 A1   Sep. 16, 2010

(30) Foreign Application Priority Data

Mar. 12, 2009 (KR) .................. 10-2009-0021382

(51) Int. Cl.
| | |
|---|---|
| H04K 1/10 | (2006.01) |
| H04L 27/28 | (2006.01) |
| H04L 1/00 | (2006.01) |
| H04L 5/00 | (2006.01) |
| H04L 27/00 | (2006.01) |
| H04L 27/26 | (2006.01) |

(52) U.S. Cl.
CPC ............ *H04L 1/0068* (2013.01); *H04L 1/0057* (2013.01); *H04L 1/0065* (2013.01); *H04L 1/0072* (2013.01); *H04L 5/0007* (2013.01); *H04L 5/0048* (2013.01); *H04L 5/0053* (2013.01); *H04L 5/0064* (2013.01); *H04L 5/0094* (2013.01); *H04L 27/0012* (2013.01); *H04L 27/2605* (2013.01); *H04L 27/2626* (2013.01); *H04L 27/2662* (2013.01)

(58) Field of Classification Search
CPC .... H04L 1/0075; H04L 1/0078; H04L 1/0083
USPC .................. 375/260, 259, 261, 267, 284, 285
See application file for complete search history.

(56) References Cited

U.S. PATENT DOCUMENTS

| | | | | |
|---|---|---|---|---|
| 7,215,714 | B2* | 5/2007 | Bretl et al. ..................... | 375/262 |
| 8,520,572 | B2* | 8/2013 | Brown et al. ................. | 370/310 |
| 2003/0031198 | A1* | 2/2003 | Currivan et al. .............. | 370/465 |
| 2003/0043928 | A1 | 3/2003 | Ling et al. | |
| 2003/0095605 | A1 | 5/2003 | Das et al. | |

(Continued)

FOREIGN PATENT DOCUMENTS

| | | |
|---|---|---|
| CN | 101584142 | 11/2009 |
| EP | 1 313 245 | 4/2007 |

(Continued)

OTHER PUBLICATIONS

Hak Ju Lee: "L1 Signaling", DTG Publications, Nov. 17, 2008.

(Continued)

*Primary Examiner* — Qutbuddin Ghulamali
(74) *Attorney, Agent, or Firm* — The Farrell Law Firm, P.C.

(57) ABSTRACT

Methods and apparatus are provided for encoding information bits. The information bits are segmented, and one or more coded blocks are generated by adding parity bits to each segment of the information bits. Segmenting the information bits includes determining a number of coded blocks to be generated using a reference value, and segmenting the information bits based on the determined number of coded blocks.

15 Claims, 8 Drawing Sheets

(56) References Cited

U.S. PATENT DOCUMENTS

| | | | |
|---|---|---|---|
| 2003/0108116 A1 | 6/2003 | Kwon et al. | |
| 2004/0179586 A1 | 9/2004 | Vasudevan et al. | |
| 2005/0157803 A1 | 7/2005 | Kim et al. | |
| 2005/0276344 A1* | 12/2005 | Ling et al. | 375/260 |
| 2006/0017171 A1 | 1/2006 | Weng | |
| 2006/0262871 A1 | 11/2006 | Cho et al. | |
| 2007/0041458 A1 | 2/2007 | Hocevar et al. | |
| 2007/0101229 A1 | 5/2007 | Niu et al. | |
| 2007/0143655 A1* | 6/2007 | Niu et al. | 714/752 |
| 2008/0204286 A1 | 8/2008 | Kose | |
| 2008/0240159 A1* | 10/2008 | Palanki et al. | 370/474 |
| 2009/0219911 A1* | 9/2009 | Blankenship et al. | 370/345 |
| 2010/0061345 A1 | 3/2010 | Wengerter et al. | |

FOREIGN PATENT DOCUMENTS

| | | |
|---|---|---|
| EP | 1 944 896 | 7/2008 |
| EP | 2 237 514 | 12/2011 |
| JP | 2006-157898 | 6/2006 |
| JP | 2007-519360 | 7/2007 |
| JP | 2008-288940 | 11/2008 |
| KR | 1020030074771 | 9/2003 |
| KR | 1020040107436 | 12/2004 |
| RU | 2 258 306 | 8/2005 |
| WO | WO 2006/038653 | 4/2006 |
| WO | WO 2009/020983 | 2/2009 |

OTHER PUBLICATIONS

DVB, Frame Structure Channel Coding and Modulation for a Second Generation Digital Terrestrial Television Broadcasting System (DVB-T2), DVB Document A122r1, Jan. 2008.

Korean Office Action dated Feb. 12, 2015 issued in counterpart application No. 10-2009-0021382.

* cited by examiner

METHOD FOR ENCODING CONTROL INFORMATION IN A COMMUNICATION SYSTEM, AND METHOD AND APPARATUS FOR TRANSMITTING AND RECEIVING THE CONTROL INFORMATION

PRIORITY

This application claims priority under 35 U.S.C. §119(a) to a Korean Patent Application filed in the Korean Intellectual Property Office on Mar. 12, 2009 and assigned Serial No. 10-2009-0021382, the entire disclosure of which is hereby incorporated by reference.

BACKGROUND OF THE INVENTION

1. Field of the Invention

The present invention relates generally to a transmission and reception method in a communication system, and more particularly, to a method and apparatus for encoding control information, and transmitting and receiving the encoded control information.

2. Description of the Related Art

Broadcasting-communication services have entered the real era of digitalization, multi-channelization, broadband and high quality. With the recent prevalence of high-quality digital Television (TV) and an increase in the number of service subscribers of cable TV broadcasting, the widespread use of various digital broadcasting devices using wired/wireless communication networks has increased. A transmission scheme suitable for broadband transmission, and efficient encoding, transmission, and reception of control information required to receive broadcast data are important for providing reliable digital broadcasting services.

A typical example of a transmission scheme that is suitable for broadband transmission may include Orthogonal Frequency Division Multiplexing (OFDM). OFDM, which transmits data using multiple carriers, is a kind of Multi-Carrier Modulation (MCM) that converts a serial input symbol stream into parallel symbol streams and modulates each parallel symbol stream with multiple orthogonal subcarriers, i.e., multiple subcarrier channels, before transmission.

FIG. 1 illustrates a frame including control information in a conventional communication system.

Referring to FIG. 1, a frame 101 includes a preamble section 102, which includes preamble symbols 104, ..., 105, and a data symbol section 103, which includes data symbols 106, ... 107. The preamble section 102 is commonly used in a receiver to acquire time and frequency synchronization, synchronization for frame boundaries, etc. For these and other reasons, a transmitter of a communication system transmits the preamble section 102 before transmitting the data symbol section 103.

However, depending on the communication system, a preamble may also be used to carry signaling information as control information that is transmitted and received between the transmitter and the receiver.

FIG. 2 illustrates a configuration of an OFDM symbol carrying a preamble in a conventional communication system. More specifically, an OFDM preamble symbol illustrated in FIG. 2 is an OFDM symbol carrying a preamble. For ease of explanation, the OFDM preamble symbol will be referred to herein as an OFDM symbol.

Referring to FIG. 2, an OFDM symbol 201 includes a header 203, which is allocated to multiple subcarriers, and a coded signaling block 205 (hereinafter, merely referred to as a "coded block"). In the coded block 205, the signaling information is allocated to remaining subcarriers, which were not allocated to the header 203, i.e., $N_{L1\_Cells}$ subcarriers represented by indexes of 1 to $N_{L1\_Cells}$.

The header 203 may be used to acquire synchronization in a receiver, and may include additional information, such as a modulation scheme and a code rate for the coded block 205. Herein, it is to be noted that other subcarriers of the OFDM symbol 201, which are additionally allocated for features of a pilot or the like, have been omitted for the convenience of description.

Assuming that the preamble 102 is embodied as the OFDM symbol 201, a receiver acquires synchronization of a frame, based on the header 203 of the preamble 102, obtains control information, such as a transmission method of the data symbols 103 and a length of the frame, from the coded block 205 of the signaling information, and then receives data from the data symbols 106, ..., 107.

FIG. 3 illustrates a process of encoding and transmitting control information in a conventional communication system.

Referring to FIG. 3, a transmitter generates a coded block from signaling information provided as control information by applying a coding technique based on a proper error correction code, and then allocates $N_{L1\_Cells}$ subcarriers available for transmitting the signaling information. More specifically, if signaling information to be transmitted is provided, a Forward Error Correction (FEC) encoder 301 generates a coded block by encoding the signaling information according to a predetermined coding scheme. A modulator 303 generates a modulation symbol by modulating the generated coded block according to a predetermined modulation scheme. Thereafter, a subcarrier mapper 305 maps the modulation symbol to the $N_{L1\_Cells}$ subcarriers available for transmission of the modulation symbol, and a header inserter 307 generates an OFDM symbol, as illustrated in FIG. 2, by attaching a header to the mapped modulation symbol.

As described above, in the conventional communication system, a coded block is generated from signaling information and transmitted in an OFDM symbol. While it has been described that one coded block is generated from signaling information and transmitted in one OFDM symbol for convenience, the signaling information may also be transmitted in more than one OFDM symbol. In this case, the communication system should segment the signaling information into multiple coded blocks and transmit the multiple coded blocks in multiple OFDM symbols, which requires an efficient segmentation scheme, coding scheme, and transmission and reception scheme.

SUMMARY OF THE INVENTION

The present invention is designed to address at least the above-mentioned problems and/or disadvantages and to provide at least the advantages described below. Accordingly, an aspect of the present invention is to provide a method for efficiently encoding control information. Another aspect of the present invention is to provide a method for efficiently encoding control information having a variable size.

Another aspect of the present invention provides an efficient encoding method for segmenting control information into multiple coded blocks and transmitting the coded blocks.

Another aspect of the present invention is to provide a method and apparatus for transmitting and receiving efficiently encoded control information.

Another aspect of the present invention provides a method and apparatus for efficiently determining a size of blocks when segmenting control information into multiple blocks and transmitting the blocks.

In accordance with an aspect of the present invention, a method for encoding information bits is provided. The information bits are segmented, and one or more coded blocks are generated by adding parity bits to each segment of the information bits. Segmenting the information bits includes determining a number of coded blocks to be generated using a reference value, and segmenting the information bits based on the determined number of coded blocks.

In accordance with another aspect of the present invention, an apparatus for encoding information bits is provided. The apparatus includes a controller for determining a number of coded blocks to be generated using a reference value, and an encoder for segmenting the information bits based on the determined number of coded blocks and generating one or more coded blocks by adding parity bits to each segment of the information bits.

In accordance with another aspect of the present invention, a method for decoding one or more coded blocks is provided. Information about a number of information bits is acquired, and one or more coded blocks are decoded. Decoding the one or more coded blocks includes determining a number of coded blocks to be decoded using a reference value, calculating a number of information bits in each coded block based on the acquired information about the number of information bits, and removing parity bits of each coded block.

In accordance with another aspect of the present invention, an apparatus is provided for decoding one or more coded blocks. The apparatus includes a control parameter calculator for acquiring information about a number of information bits and determining a number of coded blocks to be decoded using a reference value. The apparatus also includes a decoder for decoding one or more coded blocks by removing parity bits of each coded block based on (i) a number of information bits in each coded block calculated from the acquired information about the number of information bits and (ii) a number of parity bits punctured in each coded block.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will be described in detail herein below with reference to the annexed drawings. In the following description, a detailed description of known functions and configurations incorporated herein has been omitted for clarity and conciseness.

The present invention provides a method and apparatus for encoding signaling information and/or control information between a transmitter and a receiver, and transmitting and receiving the encoded information in a communication system. The communication system described in this specification includes wired and wireless communication systems providing digital broadcasting services and various communication services.

In accordance with an embodiment of the present invention, a transmitter segments signaling information into blocks depending on the size of the signaling information, encodes the blocks, and transmits the encoded blocks in an OFDM symbol. The blocks include the same number of bits.

In the encoding process, the transmitter appends padding bits to the signaling information. The number of padding bits is determined depending on the number of the segmented blocks.

If a size of the signaling information is large, for example, if a size of the signaling information exceeds a predetermined size of the system, the signaling information is segmented into multiple blocks.

Figure 3:
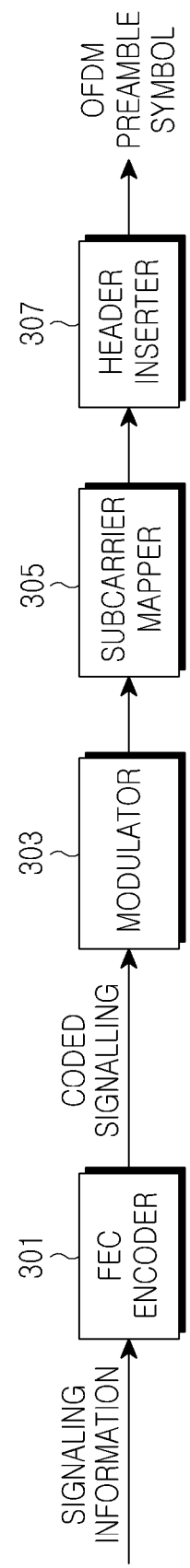
FIG. 3 illustrates a process of encoding and transmitting control information in a conventional communication system.

For example, assuming that in the system illustrated in FIG. 3, a length of a coded block encoded by the FEC encoder 301 is represented by $N_{L1}$ and a modulation order is represented by $\eta_{MOD}$, if Equation (1) below is not satisfied, the system cannot transmit the coded block of the signaling information in one OFDM symbol.

$$N_{L1}/\eta_{MOD} \leq N_{L1\_Cells} \quad (1)$$

In Equation (1), the modulation order $\eta_{MOD}$ has a value of 1, 2, 4 and 6 for Binary Phase Shift Keying (BPSK), Quadrature Phase Shift Keying (QPSK), 16-ary Quadrature Amplitude Modulation (16-QAM) and 64-QAM, respectively.

Because signaling information may occasionally not be transmitted in one OFDM symbol due to such system conditions, the signaling information is segmented. An example of a segmentation process and an encoding process for the signaling information is described in detail below.

First, assuming that signaling information includes $K_{L1\_ex\_pad}$ bits, a transmitter determines a number of coded blocks needed to encode and transmit the signaling information, using Equation (2) below.

$$N_{L1\_FEC\_Block} = \left\lceil \frac{K_{L1\_ex\_pad}}{K_{L1\_max\_per\_Symbol}} \right\rceil \quad (2)$$

In Equation (2), $\lceil x \rceil$ indicates a smallest integer greater than or equal to x, and L1 indicates Layer 1 (L1), i.e. a physical layer. Therefore, signaling information transmitted and received as control information indicates physical layer signaling information.

In Equation (2), $N_{L1\_FEC\_Block}$ indicates a number of coded blocks needed to segment the signaling information into multiple blocks and transmit them, $K_{L1\_ex\_pad}$ indicates a length of the signaling information before padding bits are appended, and $N_{L1\_max\_per\_Symbol}$ indicates a reference value used to segment the signaling information.

The transmitter segments the signaling information of a length $K_{L1\_ex\_pad}$ into $N_{L1\_FEC\_Block}$ coded blocks. When $K_{L1\_ex\_pad}$ cannot be divided by $N_{L1\_FEC\_Block}$, the transmitter appends padding bits to the signaling information to determine the number $N_{L1\_FEC\_Block}$ of the segmented coded blocks. Generally, a value of the padding bits is set to zero (0). The number $K_{L1\_PADDING}$ of the appended padding bits is determined using Equation (3).

$$K_{L1\_PADDING} = \left\lceil \frac{K_{L1\_ex\_pad}}{N_{L1\_FEC\_Block}} \right\rceil \times N_{L1\_FEC\_Block} - K_{L1\_ex\_pad} \quad (3)$$

In Equation (3), if $K_{L1\_ex\_pad}$ can be divided by $N_{L1\_FEC\_Block}$ the number $K_{L1\_PADDING}$ of padding bits appended to the signaling information is zero (0), and otherwise, $K_{L1\_PADDING}$ has a non-zero value.

Therefore, if $K_{L1\_PADDING}$ has a non-zero value, signaling information of a length $K_{L1}$ is generated by appending $K_{L1\_PADDING}$ padding bits to the signaling information of a length $K_{L1\_ex\_pad}$. A length $K_{L1}$ of the padding bit-appended signaling information is calculated using Equation (4).

$$K_{L1} = K_{L1\_ex\_pad} + K_{L1\_PADDING} \quad (4)$$

Next, the signaling information of a length $K_{L1}$ is segmented into $N_{L1\_FEC\_Block}$ blocks. In this case, the signaling information of a length $K_{L1}$ is segmented into $N_{L1\_FEC\_Block}$ blocks each having a length $K_{sig}$, which is determined using Equation (5).

$$K_{sig} = \frac{K_{L1}}{N_{L1\_FEC\_Block}} \quad (5)$$

The transmitter generates parity bits by independently encoding each of the length-$K_{sig}$ blocks of the segmented signaling information using an FEC technique, and generates a coded block with the parity bit included, for each block of the segmented signaling information. For example, the well-known concatenation coding scheme of a Bose, Chaudhuri, Hocquenghem (BCH) code and a Low-Density Parity-Check (LDPC) code may be used as the FEC technique.

In the concatenation coding scheme, the transmitter first applies a BCH coding technique to each of the blocks of the segmented signaling information, and then applies an LDPC coding technique to each of the BCH-coded blocks. For convenience, it is assumed that the BCH code has an information length of $K_{bch}$ and a parity length of $N_{bch\_parity}$, and the LDPC code has a code length (i.e., the number of bits of a codeword) of $N_{LDPC}$ and a code rate of $R_{LDPC}$.

If $K_{sig}$ of each block of the segmented signaling information is less than $K_{bch}$, an appropriate shorting method for shorting ($K_{bch} - K_{sig}$) bits is needed. A zero-padding method is generally used as the shortening method. Therefore, if zero-padded bits are not considered, the BCH-coded blocks correspond to blocks of the length-$K_{sig}$ segmented signaling information, to each of which parity bits of a length $N_{bch\_parity}$ are appended.

The transmitter applies a shortening/puncturing LDPC coding technique to the length-$K_{sig}$ blocks of the segmented signaling information and the appended parity bits of a length $N_{bch\_parity}$. When $K_{sig}$ and $\eta_{MOD}$ are given, the number $N_{punc}$ (hereinafter, referred to as "the number of final puncturing bits") of LDPC parity bits to be punctured is calculated through the following four steps.

Step 1) The transmitter performs LDPC coding and then calculates the number $N_{punc\_temp}$ (hereinafter, referred to as "the number of temporary puncturing bits") of parity bits to be temporarily punctured in each coded block, in accordance with Equation (6) below.

$$N_{punc\_temp} = \left\lfloor \frac{6}{5} \times (K_{bch} - K_{sig}) \right\rfloor \quad (6)$$

In Equation (6), $\lfloor x \rfloor$ indicates a largest integer less than or equal to x, $K_{bch}$ indicates an information length of an information word encoded when blocks of the segmented signaling information undergo BCH coding, and $K_{sig}$ indicates a length of each block in which padding bits of the segmented signaling information are included.

Step 2) The transmitter calculates a temporary length $N_{L1\_temp}$ (hereinafter, referred to as "the number of temporary codeword bits") of coded blocks of the segmented signaling information using Equation (7) below, in which $R_{LDPC}$ denotes a code rate of an LDPC code.

$$N_{L1\_temp} = K_{sig} + N_{bch\_parity} + N_{LDPC} \times (1 - R_{LDPC}) - N_{punc\_temp} \quad (7)$$

Step 3) The transmitter calculates the actual length $N_{L1}$ (hereinafter, referred to as "the number of final codeword bits") of coded blocks of the signaling information using the number of temporary codeword bits of coded blocks of the segmented signaling information in accordance with Equation (8) below.

$$N_{L1} = \begin{cases} \text{If } L1\_TI\_MODE = 00 \text{ or } 01, \\ \left\lceil \frac{N_{L1\_temp}}{2\eta_{MOD} \times N_{L1\_FEC\_Block}} \right\rceil \times 2\eta_{MOD} \times N_{L1\_FEC\_Block} \\ \text{Otherwise,} \\ \left\lceil \frac{N_{L1\_temp}}{2\eta_{MOD} \times N_{L1\_TI\_Depth}} \right\rceil \times 2\eta_{MOD} \times N_{L1\_TI\_Depth} \end{cases} \quad (8)$$

Figure 1:
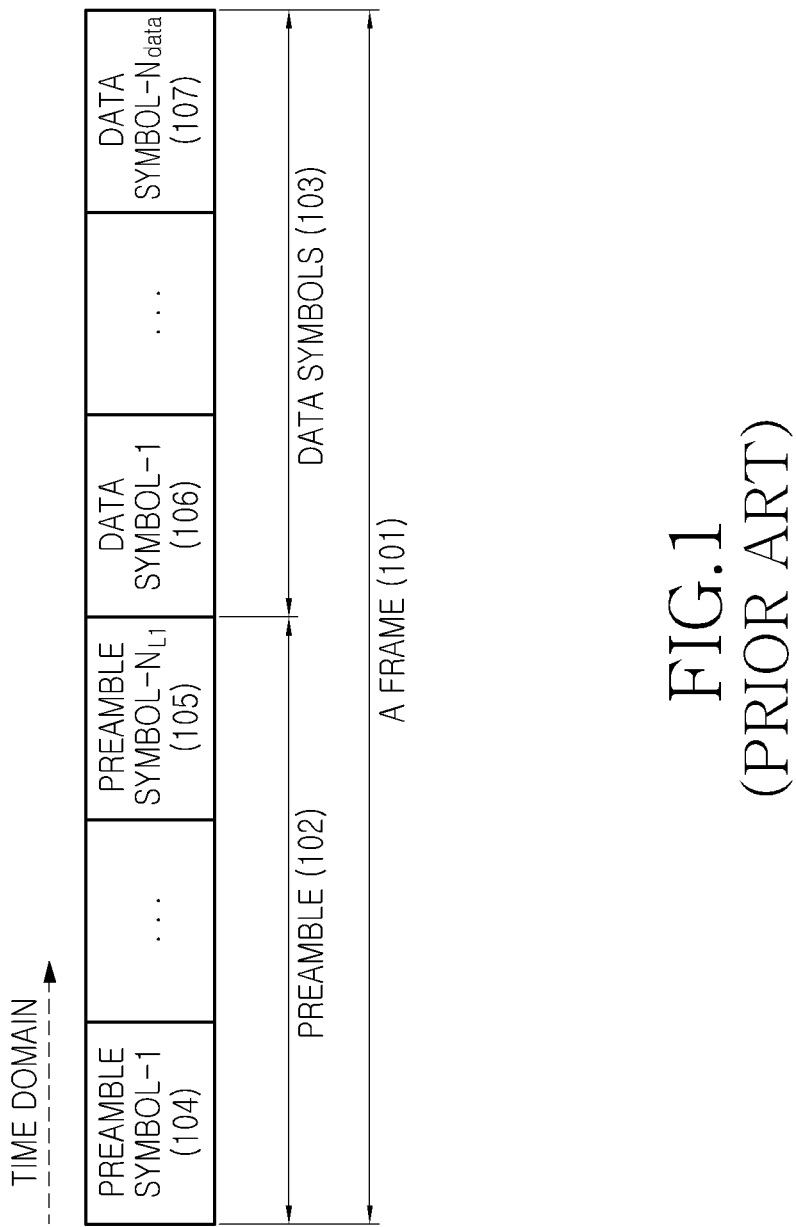
FIG. 1 illustrates a frame including control information in a conventional communication system.
Figure 2:
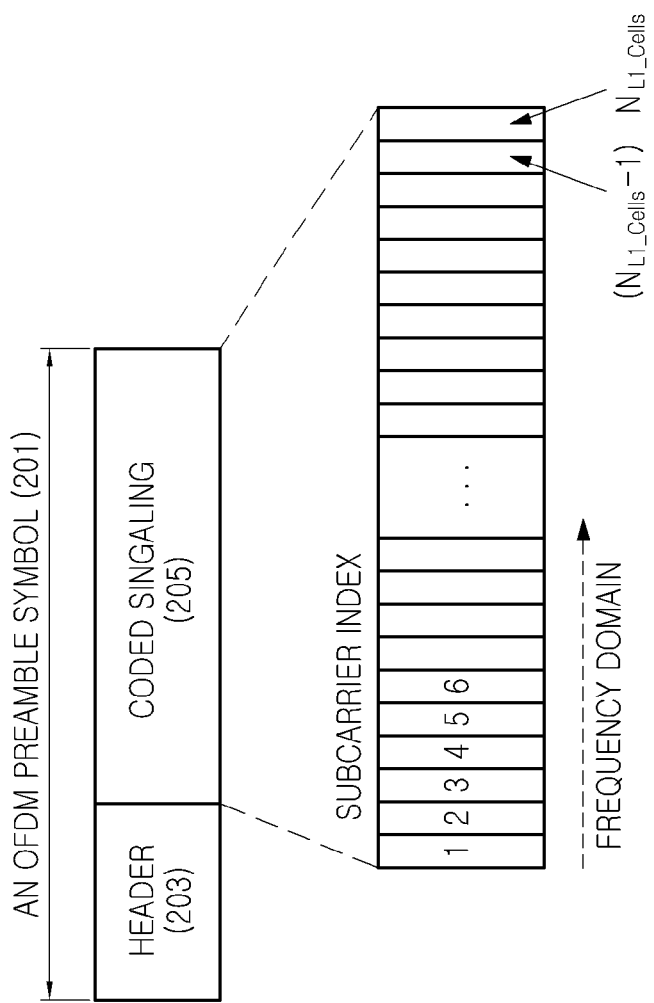
FIG. 2 illustrates an OFDM symbol in a conventional communication system.

In Equation (8), L1_TI_MODE indicates a time interleaving technique mode for coded blocks of the segmented signaling information, and this information is included in the header 203 illustrated in FIG. 2. L1_TI_MODE=00 indicates no application of the time interleaving, L1_TI_MODE=01 indicates that $N_{L1\_FEC\_Block}$ coded blocks segmented from the signaling information are transmitted in $N_{L1\_FEC\_Block}$ OFDM symbols by applying the time interleaving, and L1_TI_MODE=10 and 11 indicate that $N_{L1\_FEC\_Block}$ coded blocks segmented from the signaling information are transmitted in $N_{L1\_TI\_Depth}$ OFDM symbols by applying the time interleaving. L1_TI_Depth in $N_{L1\_TI\_Depth}$ indicates a depth of the time interleaving applied for transmission of OFDM symbols, and a value of $N_{L1\_TI\_Depth}$ can be appropriately defined according to the L1_TI_MODE mode determined in the system.

Step 4) The transmitter determines the number of LDPC parity bits to be punctured, i.e., the number $N_{punc}$ of final puncturing bits, using Equation (9) below.

$$N_{punc} = N_{punc\_temp} - (N_{L1} - N_{L1\_temp}) \quad (9)$$

In the foregoing segmentation and encoding process for the signaling information, $N_{L1\_max\_per\_Symbol}$ in Equation (2) is generally set as $K_{bch}$. Accordingly, if a length $K_{L1\_ex\_pad}$ of the signaling information is variable and has a very wide range, the maximum value of $K_{sig}$ of Equation (5) can become $K_{bch}$, and the minimum value of $N_{punc\_temp}$ becomes 0 according to Equation (6).

If $N_{L1\_max\_per\_Symbol}$, the reference value used to segment the signaling information, which has been described in Equation (2), is too large, i.e., if a codeword length $K_{bch}$ of a BCH code is too large, then the number $N_{L1}$ of final codeword bits, or a length of each coded block of the segmented signaling information may also be very large, so $N_{L1}/\eta_{MOD}$, which is defined by dividing the number of final codeword bits by the modulation order, may be undesirably greater than the number $N_{L1\_Cells}$ of subcarriers or cells that can be used to transmit signaling information in OFDM symbols.

As an example, a system having parameters as shown in Table 1 below will be considered.

TABLE 1

| OFDM and modulation parameters | BCH parameters | LDPC parameters |
|---|---|---|
| $N_{L1\_Cells}$ = 2808 | $K_{bch}$ = 7032 | $N_{LDPC}$ = 16200 |
| $\eta_{MOD}$ = 4 | $N_{bch\_parity}$ = 168 | $R_{LDPC}$ = 4/9 |

Assuming that in the system, $K_{L1\_ex\_pad}$=10000 when $N_{L1\_max\_per\_Symbol}$ is set the same as $K_{bch}$, it can be easily understood that in the system using the parameters of Table 1, signaling information of a length of, for example, 10000 bits, is segmented into two blocks of a length of 5000 bits each, with the time interleaving technique not applied, using Equations (2) to (9), and the length $N_{L1}$ of each coded block of the segmented signaling information is 11744 bits.

Therefore, in this case, because $N_{L1}/\eta_{MOD}$=2936 is greater than $N_{L1\_cells}$ (=2808) in the system, each coded block of the segmented signaling information is not mapped to one OFDM symbol.

Generally, because one coded block is transmitted in one OFDM symbol in the system where the time interleaving is not applied, $N_{L1\_max\_per\_Symbol}$ should be set less than $K_{bch}$ in an example of the above-described system.

However, if $N_{L1\_max\_per\_Symbol}$ is set too small, each coded block of the segmented signaling information may be mapped to one OFDM symbol, but a large number of OFDM symbols are needed, and some of the subcarriers included in the one OFDM symbol may be wasted. If $N_{L1\_max\_per\_Symbol}$ is set to, for example, 1000 bits, in the example of the system, the given signaling information is segmented into 10 blocks and a length $N_{L1}$ of the coded blocks is 2960 bits. In addition, because $N_{L1}/\eta_{MOD}$=740, 740 subcarriers are allocated in one OFDM symbol to transmit each coded block of the segmented signaling information, and though the remaining (2808−740=2068) subcarriers are not allocated for transmission of the coded blocks, a total of 10 OFDM symbols are needed to transmit the entire signaling information. The non-allocated or unused 2068 subcarriers are unused even for $K_{L1\_ex\_pad}$.

Therefore, the reference value $N_{L1\_max\_per\_Symbol}$ (hereinafter, referred to as a "segmentation reference value of signaling information") for segmenting the given signaling information should be appropriately set according to the system conditions, in order to efficiently segment and transmit the given signaling information while minimizing the number of wasted subcarriers and the number of needed OFDM symbols.

An optimal segmentation reference value for signaling information proposed by an embodiment of the present invention to segment the signaling information and transmit the segmented signaling information in an OFDM symbol will be described in detail below.

The optimal segmentation reference value for signaling information in accordance with an embodiment of the present invention will satisfy at least one of the following two conditions.

Condition 1) In a process of segmenting and transmitting given signaling information, when the time interleaving is not applied, each coded block of the segmented signaling information should be mapped to one OFDM symbol. Satisfying Condition 1) is equivalent to satisfying Equation (1).

Condition 2) In the process of segmenting and transmitting given signaling information, when the time interleaving is not applied, the number of OFDM symbols needed for transmission is minimized. This is equivalent to minimizing the number $N_{L1\_FEC\_Block}$ of coded blocks of Equation (2).

In accordance with an embodiment of the present invention, Conditions 1) and 2) and the segmentation reference value $N_{L1\_max\_per\_Symbol}$ for signaling information described in Equation (2) have the following relationship.

If the segmentation reference value $N_{L1\_max\_per\_Symbol}$ for signaling information increases, the number $N_{L1\_FEC\_Block}$ of coded blocks of Equation (2) tends to be decreased or remain unchanged. Therefore, in order to satisfy Condition 2), the segmentation reference value $N_{L1\_max\_per\_Symbol}$ for signaling information should be set as large as possible.

However, because the increase in the segmentation reference value $N_{L1\_max\_per\_Symbol}$ for signaling information increases the maximum value of $K_{sig}$ of Equation (5), the minimum value of $N_{punc\_temp}$ of Equation (6) decreases. As a result, because a length $N_{L1}$ of each coded block tends to increase on the whole by Equation (7) and Equation (8), $N_{L1}/\eta_{MOD}$, which is determined considering the modulation order, also tends to increase.

Therefore, an embodiment of the present invention calculates a maximum value of the segmentation reference value $N_{L1\_max\_per\_Symbol}$ for signaling information, which satisfies Equation (1).

It should be noted herein that because the length $N_{L1}$ of coded blocks is affected by the modulation order $\eta_{MOD}$ and the number $N_{L1\_FEC\_Block}$ of coded blocks in Equation (8), if the modulation order $\eta_{MOD}$ and/or the number $N_{L1\_FEC\_Block}$ of coded blocks are changed, the maximum value of the segmentation reference value $N_{L1\_max\_per\_Symbol}$ for signaling information satisfying Equation (1) is also changed.

For example, assuming that a system using the parameters of Table 1 segments and encodes given signaling information using all of Equation (2) to Equation (9), if the number $N_{L1\_FEC\_Block}$ of coded blocks is assumed to be 1, the maximum value of the segmentation reference value $N_{L1\_max\_per\_Symbol}$ for signaling information satisfying Equation (1) is calculated as 4773 bits. However, if the number $N_{L1\_FEC\_Block}$ of coded blocks is assumed to be 5, the maximum value of the segmentation reference value $N_{L1\_max\_per\_Symbol}$ for signaling information satisfying Equation (1) becomes 4759 bits.

Therefore, in order to satisfy Condition 1) and Condition 2) regardless of the modulation order $\eta_{MOD}$ or the number $N_{L1\_FEC\_Block}$ of coded blocks, a specific restriction is needed in determining the segmentation reference value $N_{L1\_max\_per\_Symbol}$ for signaling information.

With respect to the above restriction, an embodiment of the present invention defines a maximum value among the number $N_{L1\_FEC\_Block}$ of coded blocks and the depth $N_{L1\_TI\_Depth}$ of Equation (8) as the maximum number $N_{L1\_FEC\_Block\_max}$ of coded blocks, taking the time interleaving into consideration, and proposes selection criteria of the segmentation reference value $N_{L1\_max\_per\_Symbol}$ for signaling information.

Selection Criteria

The segmentation reference value $N_{L1\_max\_per\_Symbol}$ for signaling information is selected as a smallest value among maximum values of a length $K_i$ of signaling information satisfying Equation (10) below for i (where i=1, 2, ..., $N_{L1\_FEC\_Block\_max}$).

$$N_{L1}(K_i) \leq N_{L1\_Cells} \times \eta_{MOD} \qquad (10)$$

In Equation (10), $N_{L1\_Cells}$ indicates a number of subcarriers or cells that can be used to transmit signaling information, and $N_{L1}(K_i)$ indicates a length of coded blocks of the signaling information, when a length of the signaling information is represented by $K_i$, for i=$N_{L1\_FEC\_Block}$.

An example of determining the segmentation reference value $N_{L1\_max\_per\_Symbol}$ for signaling information depending on the selection criteria of the present invention will be described below.

Assuming that the system having the parameters of Table 1 segments and encodes signaling information using Equation (2) to Equation (9), and the maximum number $N_{L1\_FEC\_Block\_max}$ of coded blocks is set to 8 as an additional condition, Equation (10) can be rewritten as shown in Equation (11).

$$N_{L1}(K_i) \leq 2808 \times 4 = 11232 \qquad (11)$$

Then, based on the selection criteria, the segmentation reference value $N_{L1\_max\_per\_Symbol}$ for signaling information is selected as the smallest value among the maximum values of $K_i$ satisfying Equation (11), for i (where i=1, 2, ..., 8). If the maximum values of $K_i$ satisfying Equation (11) are represented by $K_{i,max}$ for each i, they are $K_{1,max}=K_{2,max}=K_{3,max}=K_{4,max}=K_{6,max}=4773$, $K_{5,max}=K_{7,max}=K_{8,max}=4759$.

Therefore, the segmentation reference value $N_{L1\_max\_per\_Symbol}$ for signaling information is set to 4759, which is the smallest value among the maximum values $K_{i,max}$ according to the selection criteria in accordance with an embodiment of the present invention.

Figure 4:
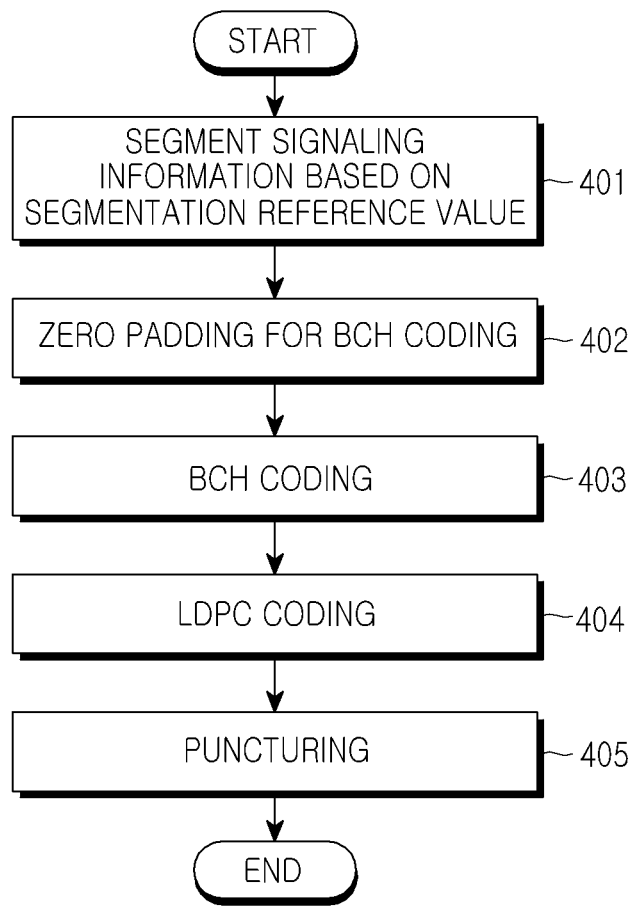
FIG. 4 is a flow chart illustrating a process of encoding control information according to an embodiment of the present invention.

FIG. 4 is a flowchart illustrating a process of encoding control information according to an embodiment of the present invention.

Referring to FIG. 4, in step 401, a transmitter performs segments signaling information into multiple blocks according to a size of the signaling information. The segmentation operation is performed based on a segmentation reference value $N_{L1\_max\_per\_Symbol}$ for signaling information, which is obtained depending on the selection criteria.

In step 402, the transmitter performs zero padding for BCH coding on each of coded blocks of the segmented signaling information. In step 403, the transmitter performs BCH coding on the padding bit-appended signaling information. The zero padding for BCH coding is distinguished from the zero padding for segmentation of signaling information in Equation (4). In step 404, the transmitter performs LDPC coding on the BCH-coded blocks of the segmented signaling information. In step 405, the transmitter performs puncturing on the LDPC-coded blocks according to the number of puncturing bits. In accordance with an embodiment of the present invention, a method of determining the number of puncturing bits may include Steps 1) to 4). The results finally obtained through the above-described processes correspond to the coded blocks of the segmented signaling information.

Figure 5:
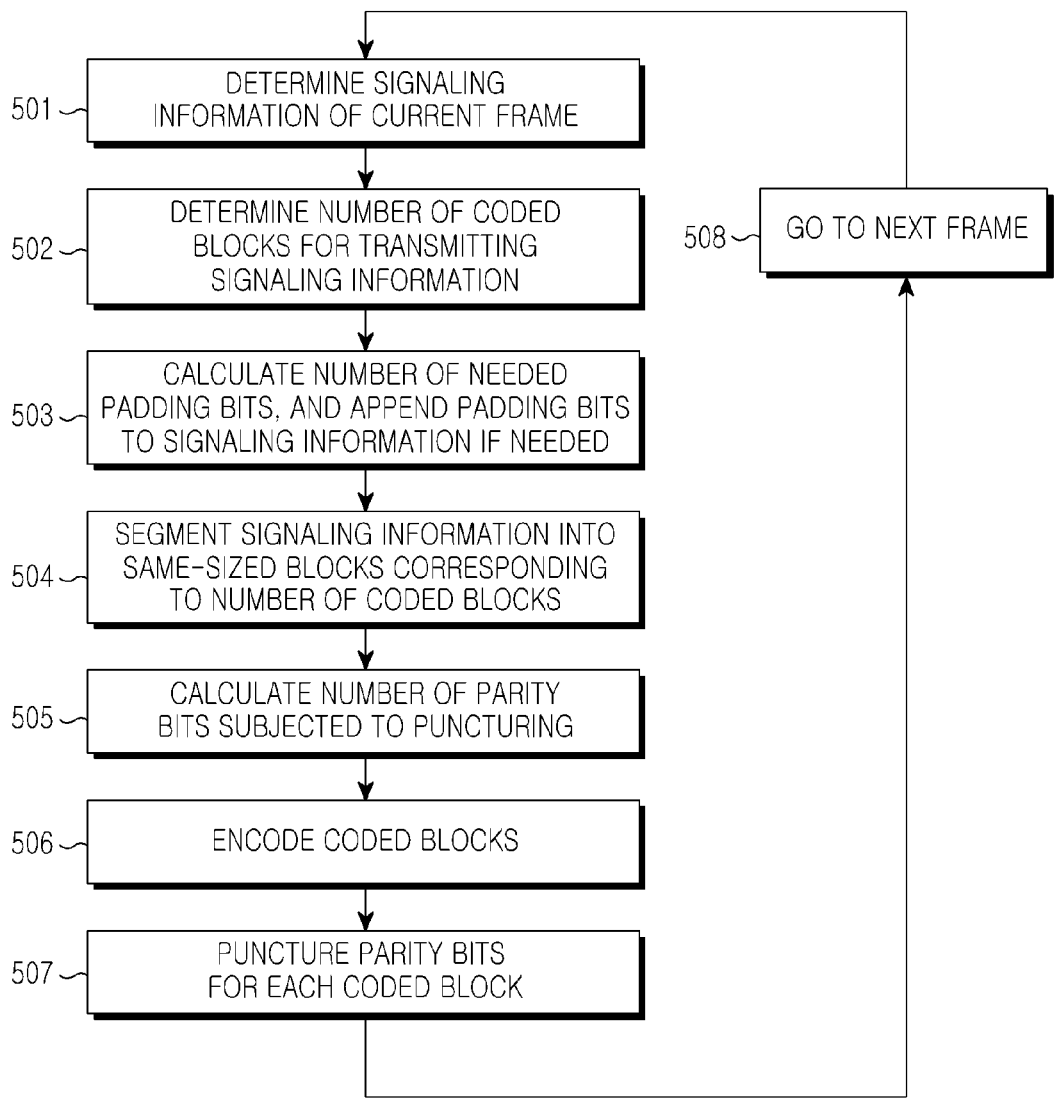
FIG. 5 is a flowchart illustrating a method of segmenting, encoding, and transmitting control information according to an embodiment of the present invention.

FIG. 5 illustrates a method of segmenting, encoding, and transmitting signaling information according to an embodiment of the present invention.

Referring to FIG. 5, signaling information of a current frame is determined in step 501, and a transmitter determines a number of coded blocks with which it will transmit the signaling information, using Equation (2), in step 502. More specifically, the transmitter applies a segmentation reference value $N_{L1\_max\_per\_Symbol}$ for signaling information obtained based on the selection criteria.

In step 503, the transmitter calculates a number of padding bits needed for segmentation of the signaling information in accordance with Equation (3), and appends the padding bits to the signaling information, if needed. In step 504, the transmitter segments the signaling information into same-sized blocks corresponding to the number of coded blocks, which is determined in accordance with Equation (5). The signaling information segmented in step 504 is not greater in size than the segmentation reference value $N_{L1\_max\_per\_Symbol}$ for signaling information obtained by the selection criteria.

Thereafter, in step 505, the transmitter calculates a number of parity bits to be subjected to puncturing, for the coded blocks, using Equations (6) to (9). In step 506, the transmitter generates as many coded blocks as the number determined in step 502 by performing FEC coding on the signaling information segmented in step 504. In step 507, the transmitter punctures as many parity bits as the number determined in step 505, for each of the coded blocks generated in step 506. In step 508, the transmitter transmits the final coded blocks determined in step 507, begins processing the next frame, and then repeats steps 501 to 507 for the next frame.

Figure 6:
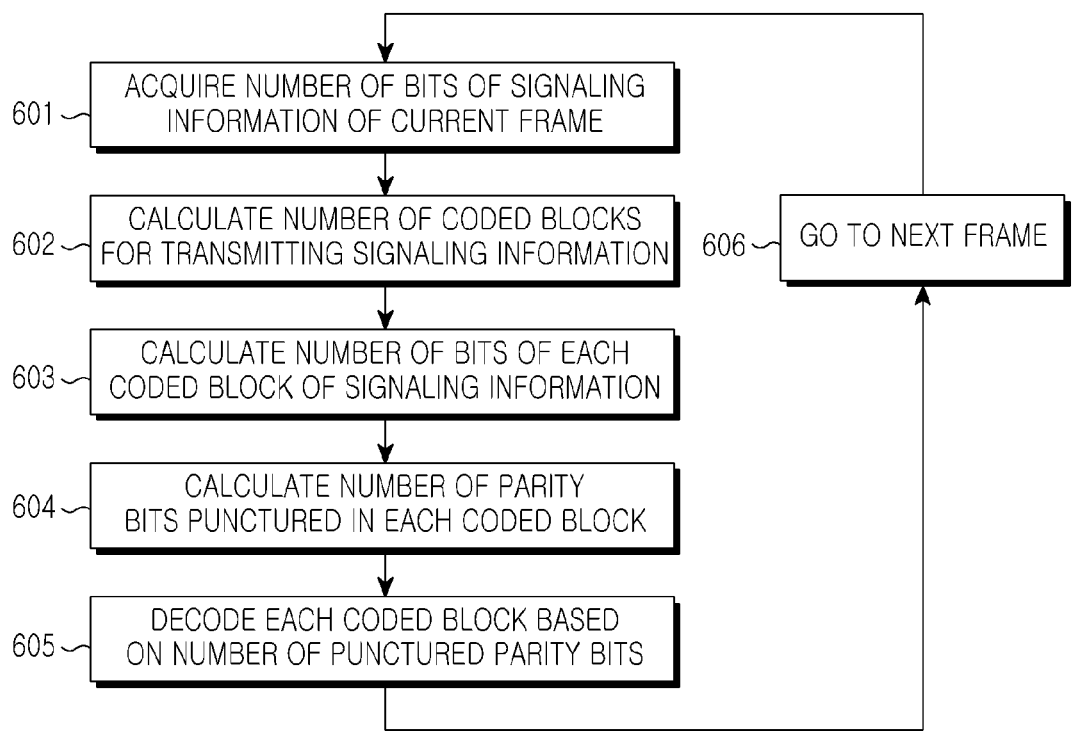
FIG. 6 is a flowchart illustrating a method of receiving control information according to an embodiment of the present invention.

FIG. 6 illustrates a method of receiving signaling information according to an embodiment of the present invention.

Referring to FIG. 6, in step 601, a receiver acquires a number of bits of signaling information being transmitted in a current frame. The number of bits of the signaling information may be obtained by receiving and decoding a header 203 of an OFDM symbol. Because the number of bits of the transmitted signaling information can be acquired from the header 203, the receiver can calculate and acquire the number $K_{L1}$ of bits of signaling information, including padding bits that were appended during segmentation of the signaling information. As another example, it is also possible to directly acquire the number $K_{L1}$ of bits of the padding bit-inserted signaling information from the header 203 of the OFDM symbol.

In step 602, the receiver calculates a number of coded blocks through which the signaling information is transmitted, using Equation (12) below.

$$N_{L1\_FEC\_Block} = \frac{K_{L1}}{N_{L1\_max\_per\_Symbol}} \qquad (12)$$

It is to be noted that a segmentation reference value $N_{L1\_max\_per\_Symbol}$ for signaling information is set as a value acquired based on the selection criteria.

In step 603, the receiver calculates a length $K_{sig}$ (the number of bits) of respective coded blocks segmented from the signaling information in accordance with Equation (5) above.

In step 604, the receiver calculates the number of parity bits to be punctured each coded block. A method of calculating the number of puncturing bits is identical to the method described using Equation (6) to Equation (9). In step 605, the receiver restores the received signaling information by decoding each of coded blocks, the number of which is determined in step 602, using the calculated number of puncturing bits. In step 606, the receiver begins processing the next frame and repeats steps 501 to 507.

Figure 7:
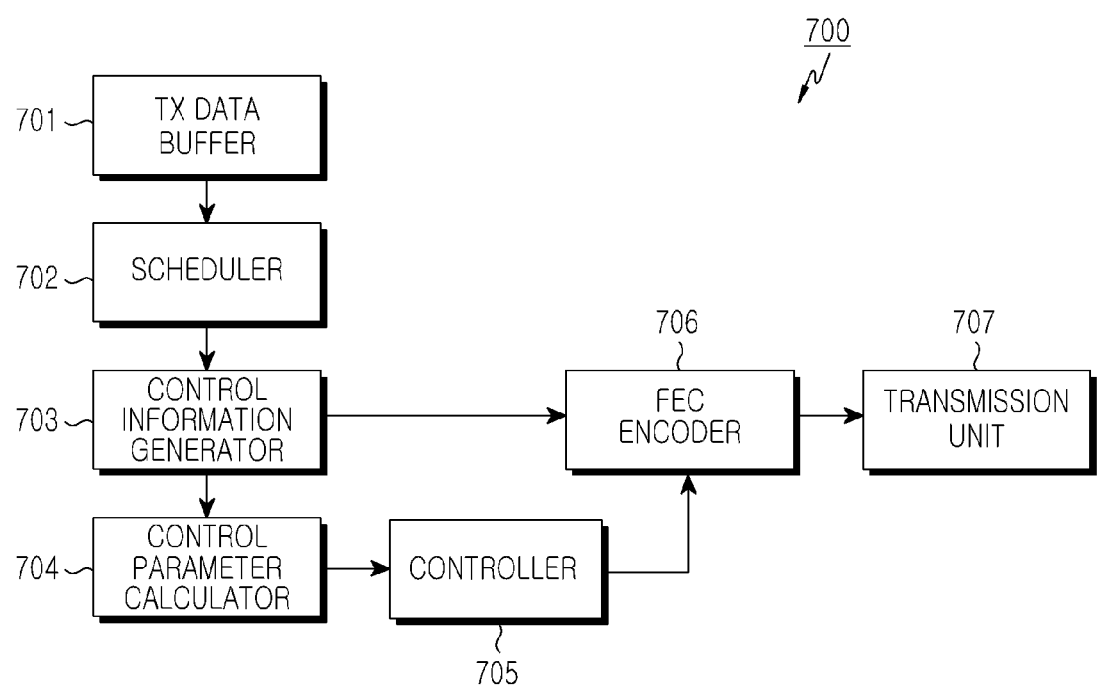
FIG. 7 is a block diagram illustrating a transmitter according to an embodiment of the present invention.

FIG. 7 illustrates a transmitter according to an embodiment of the present invention. Specifically, FIG. 7 illustrates a transmitter for transmitting physical layer (L1) signaling information as control information.

Referring to FIG. 7, the transmitter 700 includes a transmission data buffer 701, a scheduler 702, a control information generator 703, a control parameter calculator 704, a controller 705, an FEC encoder 706, and a transmission unit 707. Because the control information is signaling information, the control information generator 703 generates signaling information, and the transmission unit 707 transmits the signaling information.

When the communication system provides a broadcast service, the transmission data buffer 701 buffers service data to be transmitted in multiple broadcast service channels, and when the communication system offers a communication service, the transmission data buffer 701 buffers service data provided in the communication service.

The scheduler 702 performs scheduling by receiving the status about the data buffered in the transmission data buffer 701. The scheduling operation includes determining the configuration of a frame by including OFDM symbols and data symbols to be transmitted, in a particular frame or every frame. The signaling information is transmitted in the OFDM symbol. The scheduling results are input to the control information generator 703.

The control information generator 703 generates specific signaling field values from which the frame configuration can be determined. The control parameter calculator 704 receiving the field values calculates the number $N_{L1\_FEC\_Block}$ of coded blocks of segmented signaling information, the number of padding bits for segmentation, the number of bits of the segmented signaling information, and the number of parity bits to be punctured, as control parameters for transmission of the signaling information, according to the method described in conjunction with FIG. 5.

The calculated control parameters are input to the controller 705. The FEC encoder 706, under the control of the controller 705, outputs coded blocks by encoding the signaling information output from the control information generator 703 according to a predetermined FEC coding scheme. The signaling information is segmented into multiple blocks based on a segmentation reference value $N_{L1\_max\_per\_Symbol}$ for signaling information according to the method described in conjunction with FIG. 5, and the segmented blocks each undergo FEC coding. A value acquired based on the selection criteria is used as the segmentation reference value $N_{L1\_max\_per\_Symbol}$ for signaling information. An output of the FEC encoder 706 is input to the transmission unit 707, and the transmission unit 707 transmits the encoded signaling information.

While it has been described that BCH and LDPC coding are used as the FEC coding scheme, other coding schemes may be used as well, as long as the proposed signaling information segmentation is available.

Figure 8:
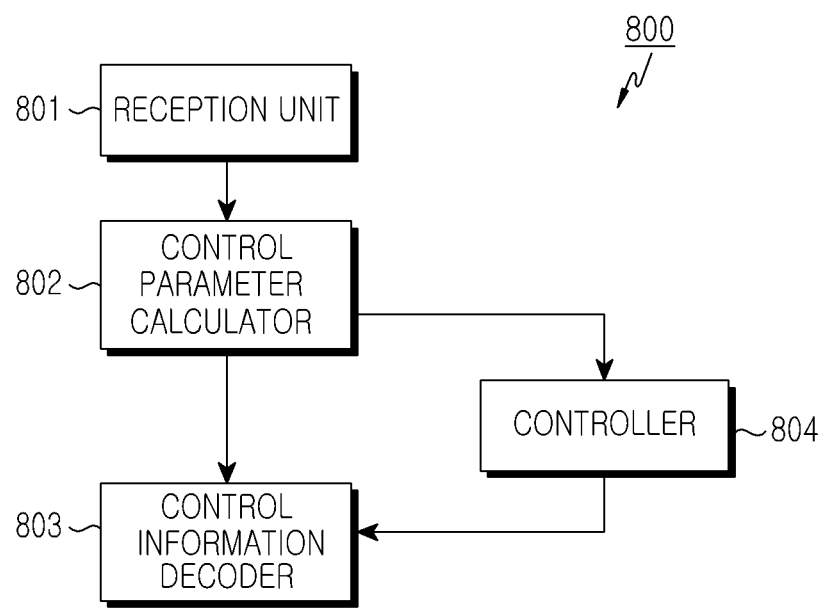
FIG. 8 is a block diagram illustrating a receiver according to an embodiment of the present invention.

FIG. 8 illustrates a receiver according to an embodiment of the present invention. Specifically, the receiver illustrated in FIG. 8 receives physical layer (L1) signaling information as control information.

Referring to FIG. 8, the receiver 800 includes a reception unit 801, a control parameter calculator 802, a control information decoder 803, and a controller 804. The receiver 800 receives and decodes signaling information according to the method illustrated in FIG. 6.

The reception unit 801 receives header information from a frame transmitted by a transmitter, and acquires information for reception of signaling informant from the header, such as the number of bits of signaling information and/or a modulation scheme (e.g., QPSK, 16QAM, 64QAM, etc.) used to transmit the signaling information. Because the number of bits of the transmitted signaling information can be acquired from the head information, the receiver 800 may calculate and acquire the number $K_{L1}$ of bits of signaling information in which padding bits for segmentation are included. The acquired information is input to the control parameter calculator 802. The control parameter calculator 802 calculates the number $N_{L1\_FEC\_Block}$ of coded blocks of signaling information based on the segmentation reference value $N_{L1\_max\_per\_Symbol}$ for signaling information using Equation (12), calculates the number of bits of segmented signaling information using Equation (13), and calculates the number of punctured parity bits, i.e., the number of puncturing bits in coded blocks, using Equations (6) to (9).

The control parameters calculated by the control parameter calculator 802 are input to the controller 804, and the controller 804 controls the control information decoder 803 using the calculated control parameters to decode the signaling information transmitted on OFDM symbols in the frame.

As is apparent from the foregoing description, in segmenting signaling information into coded blocks having a same number of bits and inserting padding bits before encoding, signaling information can be segmented into coded blocks having an optimal number of bits, thereby most efficiently transmitting the signaling information in terms of frequency and time.

By segmenting the signaling information into coded blocks having the optimal number of bits during transmission, communication resources can be used more efficiently.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for encoding information bits, the method comprising the steps of:
   determining a number of coded blocks to be generated using a number of the information bits and a reference value determined by coded block lengths, a number of subcarriers available for transmission, and a modulation order;
   segmenting the information bits based on the determined number of coded blocks; and
   generating one or more of the coded blocks by adding parity bits to each segment of the information bits.

2. The method of claim 1, wherein the reference value is determined by the number of subcarriers available for transmission and the modulation order so as to maximize a number of information bits to be mapped to one OFDM symbol and minimize a number of OFDM symbols needed for transmission.

3. The method of claim 1, wherein determining the number of coded blocks to be generated using the reference value comprises:
   determining maximum values, wherein each respective value is for a length of information bits satisfying each of the coded block lengths that is less than or equal to the number of the subcarriers available for transmission of the information bits multiplied by the modulation order;
assigning a minimum value among the determined maximum values as the reference value.

4. An apparatus for encoding information bits, the apparatus comprising:
a controller configured to determine a number of coded blocks to be generated using a number of the information bits and a reference value determined by coded block lengths, a number of subcarriers available for transmission, and a modulation order; and
an encoder configured to segment the information bits based on the determined number of the coded blocks, and to generate one or more of the coded blocks and to generate one or more coded blocks by adding parity bits to each segment of the information bits.

5. The apparatus of claim 4, wherein the reference value is determined by the number of subcarriers available for transmission and the modulation order so as to maximize the number of the information bits to be mapped to one OFDM symbol and minimize a number of OFDM symbols needed for transmission.

6. The apparatus of claim 4, wherein the reference value is assigned from a minimum value among maximum values for a length of information bits satisfying each of the coded block lengths that is less than or equal to the number of the subcarriers available for transmission of the information bits multiplied by the modulation order.

7. A method for decoding one or more coded blocks, the method comprising the steps of:
acquiring information about information bits;
determining a number of coded blocks to be decoded using a number of the information bits and a reference value determined by coded block lengths, a number of subcarriers available for transmission, and a modulation order;
calculating a number of information bits in each coded block based on the acquired information about the information bits; and
removing parity bits of each coded block.

8. The method of claim 7, further comprising:
calculating a number of parity bits punctured in each coded block; and
determining the parity bits to be removed in each coded block based on the number of the information bits and the number of parity bits punctured in each coded block.

9. The method of claim 7, wherein the reference value is determined by the number of the subcarriers available for transmission and the modulation order so as to maximize the number of the information bits to be mapped to one Orthogonal Frequency-Division Multiplexing (OFDM) symbol and minimize a number of OFDM symbols needed for transmission.

10. The method of claim 7, wherein determining the number of coded blocks to be decoded using the reference value comprises:
determining a respective maximum value for a length of information bits satisfying each of the coded block lengths that is less than or equal to the number of the subcarriers available for transmission of the information bits multiplied by the modulation order;
assigning a minimum value among the determined maximum values as the reference value.

11. An apparatus for decoding one or more coded blocks, the apparatus comprising:
a control parameter calculator configured to acquire information about information bits, and to determine a number of coded blocks to be decoded using a number of the information bits and a reference value determined by coded block lengths, a number of subcarriers available for transmission, and a modulation order; and
a decoder configured to decode one or more of the coded blocks by removing parity bits of each coded block based on (i) the number of the information bits in each of the coded block calculated from the information about the information bits and (ii) a number of parity bits punctured in each coded block.

12. The apparatus of claim 11, wherein the reference value is determined by the number of subcarriers available for transmission and the modulation order so as to maximize the number of the information bits to be mapped to one Orthogonal Frequency-Division Multiplexing (OFDM) symbol and minimize a number of OFDM symbols needed for transmission.

13. The apparatus of claim 11, wherein the reference value is assigned from a minimum value among maximum values of the length of the information bits satisfying each of the coded block lengths that is less than or equal to the number of subcarriers available for transmission of the information bits multiplied by the modulation order.

14. A transmitter of a communication system, the transmitter comprising:
a transmission data buffer;
a controller configured to determine a number of coded blocks to be generated using a number of the information bits and a reference value determined by coded block lengths, a number of subcarriers available for transmission, and a modulation order;
an encoder configured to segment the information bits based on the determined number of the coded blocks, and to generate one or more coded blocks by adding parity bits to each segment of the information bits; and
a transmission unit configured to transmit the one or more coded blocks in a frame to a receiver of the communication system.

15. A receiver of a communication system, the receiver comprising:
a reception unit configured to receive a frame from a transmitter of the communication system;
a control parameter calculator configured to acquire information about information bits from the frame, and to determine a number of coded blocks to be decoded using a number of the information bits and a reference value determined by coded block lengths, a number of subcarriers available for transmission, and a modulation order; and
a decoder configured to decode one or more coded blocks of the frame by removing parity bits of each coded block based on (i) the number of the information bits in each of the coded blocks calculated from the information about the information bits and (ii) a number of parity bits punctured in each of the coded blocks.

* * * * *